United States Patent [19]
Bettcher

[11] 3,852,882
[45] Dec. 10, 1974

[54] AIR DRIVEN BONING AND TRIMMING KNIVES

[75] Inventor: Louis A. Bettcher, Amherst, Ohio

[73] Assignee: Bettcher Industries, Inc., Birmingham, Ohio

[22] Filed: Jan. 28, 1974

[21] Appl. No.: 437,526

[52] U.S. Cl. .................. 30/276, 30/316, 30/347
[51] Int. Cl. ............................................. B26b 15/00
[58] Field of Search ............ 30/276, 300, 301, 310, 30/316, 347

[56] References Cited
UNITED STATES PATENTS

| | | | |
|---|---|---|---|
| 3,176,397 | 4/1965 | Schuhmann | 30/347 X |
| 3,269,010 | 8/1966 | Bettcher | 30/276 |
| 3,602,990 | 9/1971 | Stumpf | 30/276 |
| 3,605,841 | 9/1971 | Lindstrom et al. | 30/276 |

FOREIGN PATENTS OR APPLICATIONS

| | | | |
|---|---|---|---|
| 361,014 | 7/1938 | Italy | 30/276 |
| 729,322 | 12/1966 | Italy | 30/310 |

Primary Examiner—Al Lawrence Smith
Assistant Examiner—J. T. Zatarga
Attorney, Agent, or Firm—Watts, Hoffman, Fisher & Heine Co.

[57] ABSTRACT

A hand knife having a ring-like rotary blade the diameter of which is considerably greater than its axial length rotated by an air motor in a handle extending normal to the axis of rotation of the blade.

8 Claims, 5 Drawing Figures

AIR DRIVEN BONING AND TRIMMING KNIVES

BACKGROUND OF THE INVENTION

1. Field of Invention

The invention relates to hand knives having ring-like rotary cutting blades used primarily in the packing house, and meat distribution industry, for removing meat from bones and for trimming and slicing various meat products.

2. Description of the Prior Art

Hand knives having ring-like rotary blades have been used for some time in packing houses, meat distribution or wholesale houses and the like, for boning and trimming meat products. The blades are rotated by remote electric motors connected to the blades by flexible shaft drives. Such prior art knives are disclosed in Bettcher U.S. Pat. Nos.: 2,827,657 and 3,269,010. Because these knives are used largely in damp locations to work on moist meat products, there is always the danger of an operator receiving an electrical shock due to some malfunctioning of the electric system, such as a short circuit in the motor, etc. Because of exposure of the hand piece to grease and the dangers of electric shock, the on-off switch for the drive motor is not located at the hand piece making it inconvenient for the operator to start and stop the knife. Another disadvantage of such knives is the possibility of the products being worked up becoming contaminated with oil or grease used to lubricate the flexible drives, etc. The limited flexibility and length of the flexible shaft drives restrict the operator in his movements about the work area and his manipulation of the knife. It also increases operator fatigue because of the drag of the flexible shaft on the hand piece and the further fact that part of the weight of the knife proper is carried by the flexible shaft and the balance of the knife in the operator's hand is constantly changing. Because of friction in the flexible shaft the speed of the blade decreases as it encounters more resistance, as by striking a hard piece of fat, etc., which decreases the efficiency.

SUMMARY OF THE INVENTION

The invention provides a novel and improved hand knife having a power driven ring-like rotary cutting blade suitable for use in packing houses, and the like, which eliminates any possibility of the operator receiving an electric shock because of some malfunctioning of the device, minimizes the possibility of the product being operated upon becoming contaminated from the device, is light in weight, has a properly balanced hand piece, provides the operator almost unlimited freedom of movement about the work area, and provides convenient and safe control over the starting, stopping of the blade rotation.

More specifically, the invention provides a novel and improved hand knife having a power driven ring-like rotatable blade suitable for use in packing houses, and the like, which is light in weight and readily manipulated by an operator having the blade driven by an air-motor located in or built into the handle of the knife.

Further objects and advantages of the invention will be hereinafter referred to and/or be apparent from the following description of two preferred embodiments of the invention.

DESCRIPTION OF THE PREFERRED EMBODIMENTS

Figure 1:
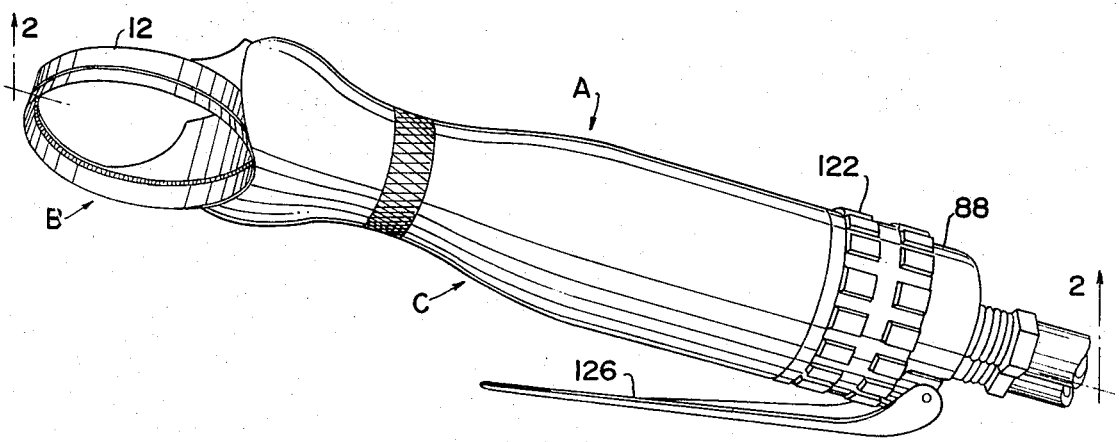
FIG. 1 is a perspective view, with parts broken away, of a knife embodying the invention.
Figure 3:
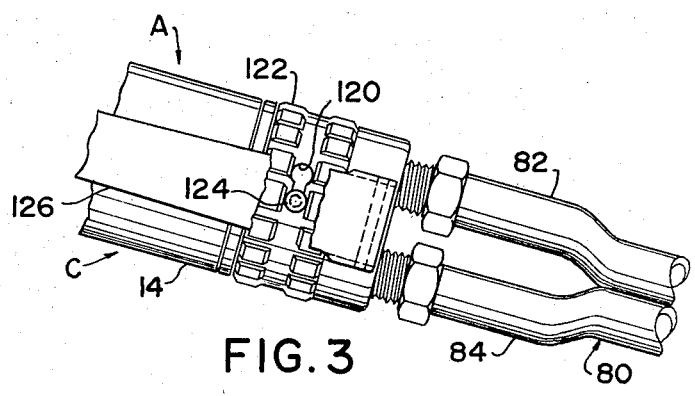
FIG. 3 is a fragmentary elevational view, with parts broken away, of the knife shown in FIGS. 1 and 2.
Figure 2:
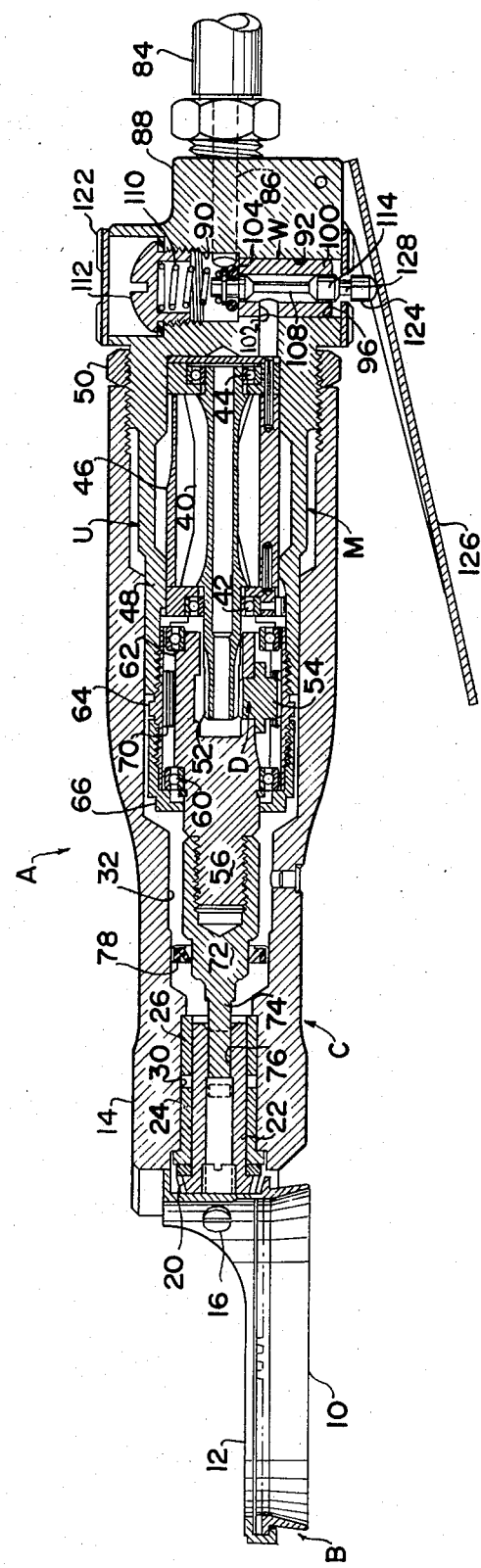
FIG. 2 is a sectional view with portions in elevation, approximately on the line 2—2 of FIG. 1.

The knife shown in FIGS. 1 to 3 of the drawings and designated generally by the reference character A comprises an annular ring-like blade B of relatively short axial length having a peripheral cutting edge 10 at one end and supported for rotation in a hand piece C. The knife blade A is generally similar to that shown in the aforementioned Bettcher U.S. Pat. No. 2,827,657 and the knife B may be referred to as "boning" knife, that is, one intended primarily for removing meat from bones. The blade A is rotatably supported in an annular blade supporting housing or member 12 of the handle assembly C. The member 12 is attached to a hollow, tubular handle 14 by screws 16. The blade B is rotated in the member 12 by a gear 20 having an elongated hub 22 rotatably supported by spaced bearing members 24, 26 fixed in the forward part 30 of a bore 32 in the handle 14 by a forced fit. The gear 20 is rotated by a unitary rotary pneumatic motor M and a gear reduction drive D designated generally by the reference character U located in the handle 14. The location of the motor M and the gear drive D in the handle 14 is such as to provide the proper balance to the knife for cutting hard parts of products up and minimum operator fatigue.

The motor M comprises a vaned rotor 40 rotatably supported by anti-friction bearings 42, 44 in the motor case or housing 46 fixed in a tubular housing member 48 threaded into the right-hand end of the handle 14, that is, the end opposite the blade B and secured therein by a lock nut 50. The rotor 40 projects toward the blade B through the bearing 42 and is provided thereon with gear teeth 52 in mesh with one or more pinion gears 54 rotatably supported in a member 56 in turn rotatably supported by anti-friction bearings 60, 62 in a tubular member 64, one end of which is threaded into the adjacent end of the member 48. The other end of the member 64 has a cap-like member 66 threaded thereon which assists in supporting bearing 60 and facilitates its assembly with the member 64. The pinion 54 is not only in mesh with the teeth 52 on the rotor 40 but is also in mesh with internal teeth 70 on the interior of the member 64. The end of the member 56 extending toward the blade B is provided with a driving member 72 which has a square projection 74 extending into a square aperture 76 in the end of the hub 22 of the gear 20. A seal 78 prevents the escape of oil or the like from the drive D to the knife B about the drive member 72.

Air is supplied to and exhausted from the knife A, or more particularly the motor M thereof, through a flexible elastomer member 80 providing supply and exhaust conduits 82, 84.

The conduit 84 connects with a conduit 86 in an enlarged or head-like part 88 of the member 48 and opens into the larger part 90 of a two-part cylindrical aperture 92 in the head 88. The cylindrical aperture 92 extends transversely of the length of the handle 14. The smaller part of the aperture 92 which is coaxial with the larger part 90 is designated by the reference character 96. The flow of air to the motor M is controlled by a manually operable valve assembly designated generally by the reference character W, and located in the aperture 92 in the head part 88 of the member 48. The valve assembly W is of conventional construction and comprises a tubular member 100 fixed in the smaller part 96 of the aperture 92 by a press fit and provided with an aperture 102 communicating with the supply port or aperture of the motor M. The end of the tubular member 100 opening into the aperture 90 forms a valve seat for a valve proper in the form of an elastomer O-ring 104 fixed in a groove on a valve stem 108. The O-ring 104 is biased in the direction of the valve seat by a coil spring 110 interposed between a shoulder formed on the upper end of the valve stem as viewed in FIG. 2 and a cap or plug member 112 threaded into the aperture 96. An enlargement 114 on the valve stem 108 at the side of conduit 102 opposite the O-ring valve closes the outer end of the tube 100.

The end of the valve stem 108 opposite the O-ring 104 extends beyond the outer end of the tube 100 of the valve assembly and through a key hole slot 120 in a control ring 122 to the exterior of the handle 14 where it is provided with a head part 124 which abuts against a control lever or throttle 126 pivoted to the handle 14. The control lever 126 extends lengthwise of the handle 14 and is manually movable for controlling the flow of fluid to the motor M. The head part 120 of the valve stem 108 is connected to the part 114 by a part 128 of reduced diameter and the member 122 is rotatable on the exterior of the head part 88 of the member 14 and is biased by a spring in the direction to normally maintain the reduced diameter part 128 of the valve stem in the narrow part of the slot 120. In order to depress the valve stem 108 by the throttle 126 and operate the motor M, it is necessary for the operator to first rotate the ring member 122 to align the enlarged part of the slot 120 with the valve 108. This is an important safety feature as the operator is required to have both his hands clear of the blade of the knife before he can start it rotating. The ring member 122 can be released after the motor starts operating as long as the throttle is depressed as the head part 124 will prevent return of the member 122 to its normal rest position until the reduced diameter part 128 of the valve realigns with the slot 120.

The exhaust port for the motor M is connected by conduits, not shown, in the head 88 of the member 50 to the exhaust conduit 84 of the member 80 through which the air used to operate the motor is preferably exhausted to an area outside of that in which the knife is being used thus eliminating any possibility of the product being operated upon being contaminated from impurities, for example oil, in the air used to operate the motor. If it is not desirable or satisfactory to exhaust the air from the motor M outside of the area in which the knife is being operated a filter and/or silencer may be connected with the exhaust port of the motor M.

Figure 4:
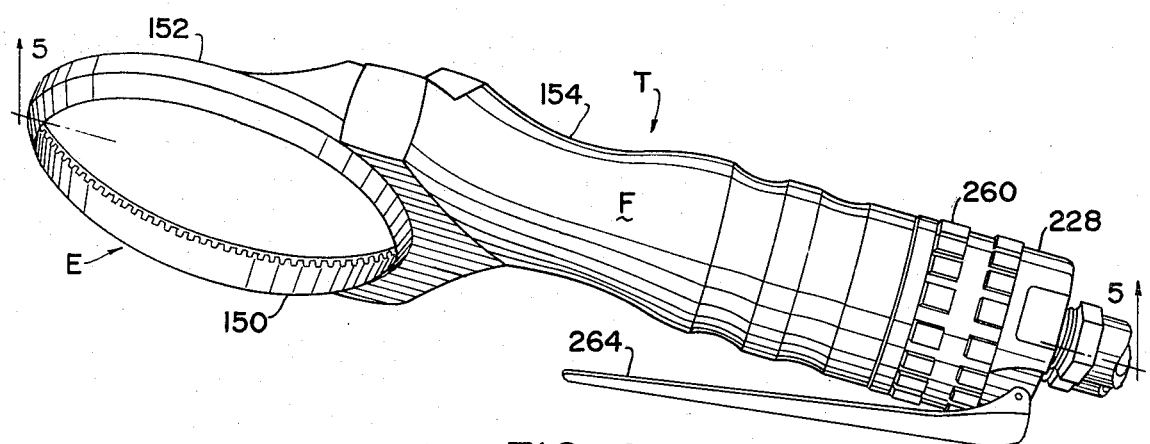
FIG. 4 is a perspective view of another knife embodying the invention.
Figure 5:
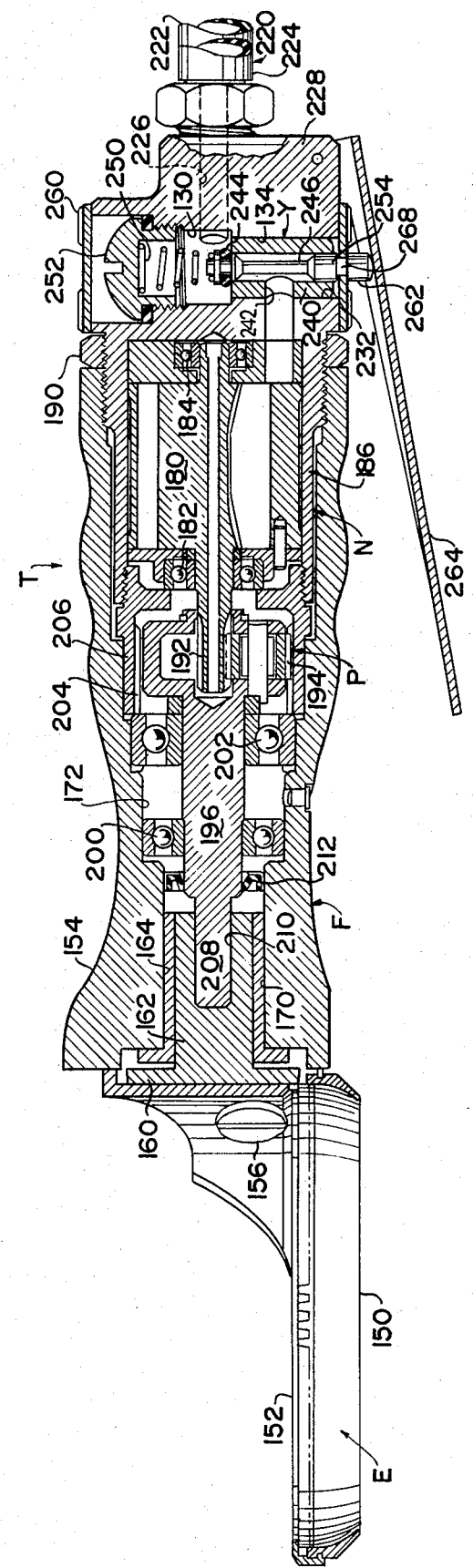
FIG. 5 is a sectional view, with portions in elevation, approximately on the line 5—5 of FIG. 4.

The knife shown in FIGS. 4 and 5 of the drawings and designated generally by the reference character T comprises an annular ring-like rotary blade E of relatively short axial length and having a radially inwardly facing peripheral cutting edge 150 at one end. The blade E is similar to the blade shown in the aforementioned Bettcher U.S. Pat. No. 3,269,010, is about twice the diameter of the blade A, and the knife T may be referred to as a "trimming and slicing" knife. The blade E is rotatably supported in an annular blade supporting housing or member 152 of the handle assembly F. The member 152 is attached to a hollow, tubular handle 154 by screws 156 and the blade is rotated in the member 152 by a gear 160 having an elongated hub 162 rotatably supported by a bearing member 164 fixed in the forward part 170 of a bore 172 in the handle 154 by a forced fit. The gear 160 is rotated by a rotary pneumatic motor designated generally by the reference character N located in the handle 154. Since the blade E is larger than the blade B of knife A the motor N is more powerful than motor M and the gear reduction drive P therebetween and the gear 160 is a unit or assembly separate from the motor unit N. This is the principal difference between the knives A and T.

The motor N comprises a vaned rotor 180 rotatably supported by anti-friction bearings 182, 184 in the motor case or housing 186 fixed in a tubular member 188 threaded into the end of the handle member 154 opposite the blade E and secured therein by a lock nut 190. The rotor 180 projects toward the blade E through the bearing 182 and is provided thereon with gear teeth 192 in mesh with one or more pinion gears 194 rotatably supported in a member 196 in turn rotatably supported by anti-friction bearings 200, 202 in handle 154 independent of the motor N which is supported in the assembly formed by the parts 186 and 206. The pinion 194 is not only in mesh with the teeth 192 on the rotor 180 but is also in mesh with internal teeth 204 on the interior of the member 206 threaded into the adjacent end of the member 188. The end of the member 196 extending toward the blade E is provided with a blade driving a square projection 208 extending into a square aperture 210 in the end of the hub 162 of the gear 160. A seal 212 prevents leakage of oil, etc. from the gear drive P to the knife E around the drive member 196.

Air is supplied to and exhausted from the knife T, or more particularly the motor N thereof, through a flexible elastomer member 220 having supply and exhaust conduits 222, 224.

The conduit 222 connects with a conduit 226 in an enlarged or head-like part 228 of the member 186 and opens into the larger part 130 of a two-part cylindrical aperture 132 in the head 228. The cylindrical aperture 132 extends transversely of the length of the handle and smaller part 134 thereof which is coaxial with the larger part. The flow of air to the motor N is controlled by a manually operable valve assembly designated generally by the reference character Y, and located in the aperture 232 in the head part 228 of the member 186. The valve assembly Y is of conventional construction and comprises a tubular member 240 fixed in the smaller part of the aperture 232 by a press fit and provided with an aperture 242 communicating with the supply port or aperture of the motor N. The end of the tubular member 240 opening into the aperture 130 forms a valve seat for a valve proper in the form of an elastomer O-ring 244 fixed in a groove on a valve stem 246. The O-ring 244 is biased in the direction of the valve seat by a coil spring 250 interposed between a shoulder formed on the upper end of the valve stem as viewed in FIG. 5 and a cap or plug member 252 threaded into the aperture 130. An enlargement 254 on the valve stem 246 at the side of conduit 242 opposite the O-ring valve closes the outer end of the tube 240.

The end of the valve stem 246 opposite the O-ring 244 extends beyond the outer end of the tube 240 of the valve assembly and through a key hole slot in a control ring 260, similar to the slot 120 in control ring 122 of knife A, to the exterior of the handle 154 where it is provided with a head part 262 which abuts against a control lever or throttle 264 pivoted to the handle 154. The control lever 264 extends lengthwise of the handle 154 and is manually movable for controlling the flow of fluid to the motor N. The head part 262 of the valve stem 246 is connected to the part 254 by a part 268 of reduced diameter and the member 260 is rotatable on the exterior of the head part 228 of the member 186 and biased by a spring in the direction to normally maintain the reduced diameter part 268 of the valve stem in the narrow part of the slot. In order to depress the valve stem 246 by the throttle 264 and operate the motor N, it is necessary for the operator to first rotate the ring member 260 to align the enlarged part of the slot therein with the valve 246. This is an important safety feature as the operator is required to have both his hands clear of the blade of the knife before he can start it rotating. The ring member 260 can be released after the motor starts operating as long as the throttle is depressed as the head part 262 will prevent return of the member 260 to its normal rest position until the throttle is released and the reduced diameter part 268 of the valve realigns with the slot in the member 260.

The exhaust port for the motor N is connected by conduits, not shown, in the head 228 of the member 186 to the exhaust conduit 224 of the member 220 through which the air used to operate the motor is preferably exhausted to an area outside of that in which the knife is being used thus eliminating any possibility of the product being operated upon being contaminated from impurities, for example oil, in the air used to operate the motor. If it is not desirable or satisfactory to exhaust the air from the motor M outside of the area in which the knife is being operated, a filter and/or silencer may be connected with the exhaust port of the motor M.

From the foregoing description of the preferred embodiments it will be apparent that the objects of the invention heretofore enumerated and others have been accomplished and that there has been provided knives of the character referred to which are light in weight, convenient to operate, and because of the high flexibility and lack of restriction as to the length of the air supply and exhaust member, there is little if any drag thereby on the hand piece of the knife and movement of the operator about the product being worked upon is to all practical purposes unrestricted. This together with the fact that there is little if any change in the speed as different parts of the product being operated upon results in minimum operator fatigue and improved operator efficiency. The fact that the air throttle is at the hand piece makes it convenient for the operator to stop the motor while he is moving from one product such as, a beef carcass or primal cut to another, or waiting for spaced products on a conveyor to be brought to him, and thus reduces his exposure to knife accidents and conserves air.

As will be apparent to those skilled in the art to which the invention relates, that the invention is not limited to the particular constructions shown and described but that it may be otherwise embodied, and it is the intention to hereby cover all adaptations, modifications and uses thereof which come within the practice of those skilled in the art to which the invention relates and the spirit and scope of the appended claims.

Having thus described my invention, I claim:

1. A hand-manipulated knife comprising a blade supporting structure substantially annular in shape and including a tubular handle projecting from one side thereof, a ring-shaped blade of short axial length rotatably supported in said structure with a cutting edge at one end projecting from one side of said structure and gear teeth adjacent its other end, a first gear rotatably supported in one end of said handle and in mesh with said gear teeth on said blade for rotating said blade, a fluid pressure activated rotary motor comprising a rotor rotatably supported in a housing stationary in said handle, external gear teeth on an extension of said rotor projecting towards said blade, a member rotatably supported in said handle intermediate said motor and said first gear, a tubular member stationary in said handle intermediate said motor and said first gear provided with internal gear teeth, a second gear rotatably supported by said member and in mesh with said external and said internal gear teeth, means connecting said member to said first gear, and valve means in said handle for controlling the flow of fluid to said motor.

2. A hand-manipulated knife comprising a blade supporting structure substantially annular in shape and including a tubular handle projecting from one side thereof, a ring-shaped blade of short axial length rotatably supported in said structure with a cutting edge at one end projecting from one side of said structure and gear teeth adjacent its other end, a first gear rotatably supported in one end of said handle and in mesh with said gear teeth on said blade for rotating said blade, a tubular member detachably fixed in the end of said handle opposite to said blade and having internal gear teeth adjacent its other end, an air activated rotary motor comprising a rotor rotatably supported in a housing stationary in said tubular member, external gear teeth on an extension of said rotor projecting towards said blade, a member rotatably supported in said first tubular member and located between said motor and said first gear, a second gear rotatably supported by said member and in mesh with said external and said internal gear teeth, means connecting said member to said first gear and valve means in said tubular member for controlling the flow of fluid to said motor.

3. A hand-manipulated knife comprising a blade supporting structure substantially annular in shape and including a tubular handle projecting from one side thereof, a ring-shaped blade of short axial length rotatably supported in said structure with a cutting edge at one end projecting from one side of said structure and gear teeth adjacent its other end, a first gear rotatably supported in one end of said handle and in mesh with said gear teeth on said blade for rotating said blade, a first tubular member detachably fixed in the end of said handle opposite said blade, an air activated rotary motor comprising a rotor rotatably supported in a housing stationary in said tubular member, external gear teeth on an extension of said rotor projecting towards said blade, a tubular assembly detachably fixed to the end of said tubular member nearest to said first gear provided with internal gear teeth, a member rotatably supported in said tubular assembly and located intermediate said motor and said first gear, a second gear rotatably supported by said member and in mesh with said external and said internal gear teeth, means connecting said member to said first gear, and valve means in said tubular member for controlling the flow of air to said motor.

4. A hand-manipulated knife comprising a blade supporting structure substantially annular in shape and including a tubular handle projecting from one side thereof, a ring-shaped blade of short axial length rotatably supported in said structure with a cutting edge at one end projecting from one side of said structure and gear teeth adjacent its other end, a first gear rotatably supported in one end of said handle and in mesh with said gear teeth on said blade for rotating said blade, a first tubular member detachably fixed in the end of said handle opposite said blade, an air activated rotary motor comprising a rotor rotatably supported in a housing stationary in said first tubular member, external gear teeth on an extension of said rotor projecting towards said blade, a member rotatably supported in said handle intermediate said motor and said first gear, a second tubular member detachably fixed to the end of said first tubular member and provided with internal gear teeth, a second gear rotatably supported by said member and in mesh with said external and said internal gear teeth, means connecting said member to said first gear, and valve means in said first tubular member for controlling the flow of air to said motor.

5. A hand-manipulated knife comprising a blade supporting structure substantially annular in shape and including a tubular handle projecting from one side thereof, a ring-shaped blade of short axial length rotatably supported in said structure with a cutting edge at one end projecting from one side of said structure and gear teeth adjacent its other end, a first gear rotatably supported in one end of said handle and in mesh with said gear teeth on said blade for rotating said blade, a fluid pressure activated rotary motor comprising a rotor rotatably supported in a housing stationary in said handle, external gear teeth on an extension of said rotor projecting towards said blade, a member rotatably supported in said handle intermediate said motor and said first gear, a tubular member stationary in said handle intermediate said motor and said first gear provided with internal gear teeth, a second gear rotatably supported by said member and in mesh with said external and said internal gear teeth, means connecting said member to said first gear, a valve biased to closed position in said handle for controlling the flow of fluid to said motor, a throttle member connected to said handle for opening said valve, a sleeve rotatable on said handle and biased towards one position, and interlocking means between said valve and said sleeve preventing opening of said valve when said sleeve is in said one position.

6. A hand-manipulated knife comprising a blade supporting structure substantially annular in shape and including a tubular handle projecting from one side thereof, a ring-shaped blade of short axial length rotatably supported in said structure with a cutting edge at one end projecting from one side of said structure and gear teeth adjacent its other end, a first gear rotatably supported in one end of said handle and in mesh with said gear teeth on said blade for rotating said blade, a tubular member detachably fixed in the end of said handle opposite to said blade and having internal gear teeth adjacent its other end, an air activated rotary motor comprising a rotor rotatably supported in a housing stationary in said tubular member, external gear teeth on an extension of said rotor projecting towards said blade, a member rotatably supported in said first tubular member and located between said motor and said first gear, a second gear rotatably supported by said member and in mesh with said external and said internal gear teeth, means connecting said member to said first gear, a valve biased to closed position in said tubular member for controlling the flow of fluid to said motor, a throttle member connected with said handle for opening said valve, a sleeve rotatable on said handle and biased towards one position, and interlocking means between said valve and said sleeve preventing opening of said valve when said sleeve is in said one position.

7. A hand-manipulated knife comprising a blade supporting structure substantially annular in shape and including a tubular handle projecting from one side thereof, a ring-shaped blade of short axial length rotatably supported in said structure with a cutting edge at one end projecting from one side of said structure and gear teeth adjacent its other end, a first gear rotatably supported in one end of said handle and in mesh with said gear teeth on said blade for rotating said blade, a first tubular member detachably fixed in the end of said handle opposite said blade, an air activated rotary motor comprising a rotor rotatably supported in a housing stationary in said tubular member, external gear teeth on an extension of said rotor projecting towards said blade, a tubular assembly detachably fixed to the end of said tubular member nearest to said first gear provided with internal gear teeth, a member rotatably supported in said tubular assembly and located intermediate said motor and said first gear, a second gear rotatably supported by said member and in mesh with said external and said internal gear teeth, means connecting said member to said first gear, a valve biased to closed position in said tubular member for controlling the flow of air to said motor, a throttle member connected to said handle for opening said valve, a sleeve rotatable on said handle and biased towards one position, and interlocking means between said valve and said sleeve preventing opening of said valve when said sleeve is in said one position.

8. A hand-manipulated knife comprising a blade supporting structure substantially annular in shape and including a tubular handle projecting from one side thereof, a ring-shaped blade of short axial length rotatably supported in said structure with a cutting edge at one end projecting from one side of said strucutre and gear teeth adjacent its other end, a first gear rotatably supported in one end of said handle and in mesh with said gear teeth on said blade for rotating said blade, a first tubular member detachably fixed in the end of said handle opposite said blade, an air activated rotary motor comprising a rotor rotatably supported in a housing stationary in said first tubular member, external gear teeth on an extension of said rotor projecting towards said blade, a member rotatably supported in said handle intermediate said motor and said first gear, a second tubular member detachably fixed to the end of said first tubular member and provided with internal gear teeth, a second gear rotatably supported by said member and in mesh with said external and said internal gear teeth, means connecting said member to said first gear, a valve biased to closed position in said first tubular member for controlling the flow of air to said motor, a throttle member connected to said handle for opening said valve, a sleeve rotatable on said handle and biased towards one position, interlocking means between said valve and said sleeve preventing opening of said valve when said sleeve is in said one position, and means preventing operation return of said sleeve to said one position while said valve is open.

* * * * *